US008408496B2

(12) United States Patent
Stephan

(10) Patent No.: US 8,408,496 B2
(45) Date of Patent: Apr. 2, 2013

(54) FUSELAGE CELL STRUCTURE OF AN AIRPLANE FOR THE SIMPLIFIED INSTALLATION AND ATTACHMENT OF FASTENERS FOR FASTENING CONDUITS

(75) Inventor: Andreas Stephan, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 182 days.

(21) Appl. No.: 12/763,796

(22) Filed: Apr. 20, 2010

(65) Prior Publication Data

US 2010/0252684 A1    Oct. 7, 2010

Related U.S. Application Data

(63) Continuation of application No. PCT/EP2008/061016, filed on Aug. 22, 2008.

(60) Provisional application No. 61/001,912, filed on Nov. 5, 2007.

(30) Foreign Application Priority Data

Nov. 5, 2007    (DE) .......................... 10 2007 052 672

(51) Int. Cl.
*F16B 2/04* (2006.01)
(52) U.S. Cl. .......................................... 244/131; 248/73
(58) Field of Classification Search ............... 244/129.1, 244/131, 119; 248/72, 73, 65
See application file for complete search history.

(56) References Cited

U.S. PATENT DOCUMENTS

| 2,346,200 | A | | 4/1944 | Tinnerman | |
| 3,341,959 | A | * | 9/1967 | Sabadics | 40/607.12 |
| 3,874,035 | A | * | 4/1975 | Schuplin | 248/72 |
| 4,019,705 | A | * | 4/1977 | Habuda et al. | 248/58 |
| 4,353,519 | A | | 10/1982 | Bogart | |
| 4,425,980 | A | * | 1/1984 | Miles | 181/208 |
| 4,570,885 | A | * | 2/1986 | Heath | 248/72 |
| 4,826,113 | A | * | 5/1989 | Winters | 248/72 |
| 4,896,851 | A | * | 1/1990 | Shaull | 248/72 |
| 5,165,628 | A | * | 11/1992 | Todd et al. | 248/62 |
| 5,590,504 | A | * | 1/1997 | Heard et al. | 52/836 |
| 5,595,363 | A | * | 1/1997 | De Leebeeck | 248/72 |

(Continued)

FOREIGN PATENT DOCUMENTS

| DE | 19639339 A1 | 3/1998 |
| DE | 102007019821 | 11/2008 |

(Continued)

OTHER PUBLICATIONS

International Search Report for PCT/EP2008/061016 dated Feb. 23, 2009.

(Continued)

*Primary Examiner* — Benjamin P Lee
(74) *Attorney, Agent, or Firm* — Jenkins, Wilson, Taylor & Hunt, P.A.

(57) ABSTRACT

The invention relates to a fuselage cell structure of an aircraft for the simplified installation and attachment of at least one fastener for at least one conduit, the fuselage cell structure having a large number of reinforcing elements formed in particular using an aluminum alloy material. According to the invention, the reinforcing elements within the fuselage cell structure are provided with at least one groove in which the fasteners can be secured by producing a combined pressing and clamping fit creating a positive fit at least in certain regions. For this purpose, the fasteners can have at the lower face thereof, for example, two retaining feet which can be spread apart and attached by driving a fixing element into the groove. The reinforcing elements are continuous stringers preferably produced by extrusion and cross-bars, the required grooves being simultaneously extruded during the production process.

6 Claims, 3 Drawing Sheets

U.S. PATENT DOCUMENTS

| | | | |
|---|---|---|---|
| 5,833,417 A * | 11/1998 | Sargent et al. | 411/85 |
| 5,855,342 A * | 1/1999 | Hawkins et al. | 248/68.1 |
| 5,971,329 A * | 10/1999 | Hickey | 248/68.1 |
| 6,554,225 B1 * | 4/2003 | Anast et al. | 244/117 R |
| 6,588,711 B2 * | 7/2003 | Onishi | 248/49 |
| 6,648,273 B2 * | 11/2003 | Anast | 244/119 |
| 6,913,236 B2 * | 7/2005 | Weyandt | 248/300 |
| 7,100,885 B2 * | 9/2006 | Zerner | 248/503.1 |
| 7,163,178 B2 * | 1/2007 | Ricaud | 244/118.1 |
| 7,207,756 B2 * | 4/2007 | Vichniakov et al. | 410/115 |
| 7,261,256 B2 * | 8/2007 | Pattie et al. | 244/129.1 |
| 7,276,666 B2 * | 10/2007 | Zeuner et al. | 174/154 |
| 7,281,685 B2 * | 10/2007 | Schoene | 244/118.6 |
| 7,600,724 B2 * | 10/2009 | Nelson et al. | 248/68.1 |
| 7,607,613 B2 * | 10/2009 | Frantz et al. | 244/118.6 |
| 7,635,108 B2 * | 12/2009 | Zeuner et al. | 248/65 |
| 7,661,632 B2 * | 2/2010 | Caveney et al. | 248/74.2 |
| 7,775,477 B2 * | 8/2010 | Wood | 244/118.1 |
| 7,913,957 B2 * | 3/2011 | Nelson et al. | 248/71 |
| 7,922,130 B2 * | 4/2011 | Hawkins | 248/74.2 |
| 2001/0004099 A1 * | 6/2001 | Onishi | 248/49 |
| 2005/0082431 A1 | 4/2005 | Scown et al. | |
| 2005/0211847 A1 * | 9/2005 | Pattie et al. | 244/129.1 |
| 2006/0016937 A1 | 1/2006 | Plate et al. | |
| 2007/0257159 A1 * | 11/2007 | Nelson et al. | 248/73 |
| 2009/0026315 A1 * | 1/2009 | Edelmann et al. | 244/119 |
| 2009/0026318 A1 * | 1/2009 | Gross et al. | 244/131 |
| 2010/0243805 A1 | 9/2010 | Gross et al. | |

FOREIGN PATENT DOCUMENTS

| | | |
|---|---|---|
| GB | 2357117 A | 6/2001 |
| WO | WO 2007/133966 | 11/2007 |
| WO | WO 2008/132171 | 11/2008 |

OTHER PUBLICATIONS

European Office Action for Serial No. 08787417.8 dated Dec. 9, 2011.

Russian Office Action for Serial No. 2010119336/11 dated Jun. 20, 2012.

German Office Action for Serial No. 102007052672.7 dated Oct. 6, 2011.

* cited by examiner

FUSELAGE CELL STRUCTURE OF AN AIRPLANE FOR THE SIMPLIFIED INSTALLATION AND ATTACHMENT OF FASTENERS FOR FASTENING CONDUITS

CROSS-REFERENCE TO RELATED APPLICATIONS

This application is a continuation of PCT International Application No. PCT/EP2008/061016 filed Aug. 22, 2008, which claims the benefit of U.S. Provisional Application No. 61/001,912, filed Nov. 5, 2007 and German Patent Application No. 10 2007 052 672.7, filed Nov. 5, 2007, the entire disclosures of which are herein incorporated by reference.

FIELD OF THE INVENTION

The invention relates to a fuselage cell structure of an aircraft for the simplified installation and attachment of at least one fastener for at least one conduit, the fuselage cell structure having a large number of reinforcing elements formed in particular using an aluminium alloy material.

More and more conduits have to be guided and attached in modern aircraft, in particular in current types of passenger aircraft. The conduits may for example be electrical supply and signal lines, fibre-optic cables, hydraulic lines, water and waste water pipes and air conditioning systems. All of the conduits have to be attached in the interior of the fuselage cell structure of the aircraft.

Known embodiments of fasteners for conduits generally require preferably at least two holes to be drilled into a reinforcing element of the fuselage cell structure for each attachment point. The reinforcing elements within the fuselage cell structure may for example be stringers, crossbars or annular formers. The large number of necessary drill holes generally means that the fuselage cell structure is inevitably weakened; this adversely influences the statics of the fuselage cell and promotes the formation of fatigue cracks in the region of the drill hole. Taken together, the drill holes can thus as a result lead to an undesirable increase in the weight of the fuselage cell.

In addition, the drilling of each hole is a very laborious process. Firstly, the coordinates of the drill hole have to be defined as precisely as possible; in many cases, this currently still involves the use of large and cumbersome templates. Subsequently, the hole is drilled generally by hand using a hand drill. The chips which are produced are suction-extracted during the drilling process or have to be painstakingly removed afterwards in order to prevent future rub-marks on the conduits, resultant short circuits and/or corrosion problems. Only once the inner face of the drill hole has been treated against corrosion using a suitable plastics material is it possible to fasten in the drill hole the fastener for the conduit to be fastened. For flight safety-related reasons, misdrilled holes have to be closed with rivets in a costly procedure. In addition, incorrectly positioned drill holes in certain regions of the primary structure, for example in the head or foot region of an annular former, may require the reinforcing profiled part or reinforcing element affected to be exchanged.

SUMMARY OF THE INVENTION

The object of the invention is therefore to develop a fuselage cell structure of an aircraft in such a way that it allows facilitated attachment of fasteners for conduit systems and thus a reduction of the installation costs for the cabling, the conduits being attached within the fuselage cell structure substantially without drilling holes (in a drill hole-less manner) in supporting reinforcing elements, in particular.

This object is achieved by a fuselage cell structure having the features of patent claim 1.

The fact that the reinforcing elements have at least one groove at least in certain regions and at least one fastener for positionally fixing at least one conduit can be attached in the at least one groove allows the conduit fasteners required for cabling within the fuselage cell structure embodied in accordance with the invention to be secured in the grooves without drill holes, for example on crossbars and stringers or stringer profiled parts, by means of a clamping attachment with a positive fit. The grooves likewise allow the fasteners for the conduit to be secured at almost any desired positions along the longitudinal extension of the groove, allowing the installation of conduits to be subsequently varied more easily and in particular adapted more effectively to changing customer requirements.

The required grooves are formed preferably as early as during the process of producing the continuous reinforcing elements which are formed using aluminium alloys and generally drawn by extrusion. The continuous profiled parts are cut to length prior to integration in the fuselage cell. The reinforcing profiled parts, reinforcing elements or the supporting elements may for example be stringers for reinforcing the fuselage cell skin between annular formers or crossbars for supporting a floor frame. Alternatively, it is possible to form the groove in the extruded reinforcing elements also subsequently, by removing material.

The at least one conduit can be positionally fixed on the fastener by separate ties. Alternatively, the fastener can be configured at the upper face thereof from the outset for locking-in conduits, so simply pressing the conduit into the fastener allows it to be fixed thereto and if appropriate also detached again.

A development of the fuselage cell structure makes provision for the grooves in the reinforcing elements to have an inverted T-shaped cross-sectional geometry.

The inverted T-shaped cross-sectional geometry of the groove provides a secure fit of the fasteners allowing even heavy conduits, such as hydraulic lines or energy supply lines, for example, to be attached.

The groove has an insertion opening which is tapered compared to the base, is bounded by two inwardly pointing legs and corresponds in its configuration—apart from the insertion openings arranged in the manner of a grid—roughly to the seat rail profiled parts which are conventionally used in civil aviation for locking the seats in the passenger cabin.

If the installation of the conduits has to be altered, the fasteners can be detached from the groove again and resecured at another suitable point within the fuselage cell structure, affording greater flexibility in the cabling.

In accordance with a further advantageous configuration, the fastener has at least two retaining feet which are arranged on the fastener body at the lower face thereof and can be locked into the groove, wherein the retaining feet can be spread apart by means of a fixing element to produce a pressing and friction fit with the groove.

This configuration allows the fastener easily to be inserted into the groove and subsequently to be secured by pressing the fixing element therein by a combined positive and friction fit. The fixing element can for example be configured as a cylindrically configured press-in mandrel which, when pressed into the basic body of the fastener, spreads the retaining feet apart to produce the pressing fit. The retaining feet, which can be spread apart, eliminate the need for insertion openings in the groove, which would not be readily producible by extrusion and would require additional machining steps.

According to a development of the fastener, the fixing element is additionally protected from detachment by a separate locking mechanism with the fastener.

This prevents accidental detachment of the fastener, for example as a result of vibrations or movements of the fuselage structure.

A further configuration of the fastener provides for the groove for arranging further functional elements or structural elements, for example seat rails or the like running von transversely to the longitudinal direction of the groove, to be interrupted by at least one recess.

This allows further constructional elements to be connected, irrespective of the presence of the groove. The recesses allow seat rail profiled parts for locking the seats in passenger aircraft, for example, to be placed on and attached to the crossbars of the floor frame in the conventional manner, wherein the crossbars have, at least still in certain portions, attachment grooves for the conduit fasteners and can thus continue to be used for fastening conduits.

In accordance with a further embodiment, at least one conduit is attachable directly to the fastener.

This ensures a simple design of the fastener which is preferably formed using a fibre reinforced thermoplastic polymer. In conjunction with the reinforcing profiled parts which can be continuously industrially produced by extrusion, this provides a highly flexible and also time and cost-saving conduit design for the installation and positional fixing of all types of conduits in aircraft fuselage cells. In principle, all types of conduits, including in particular relatively heavy conduits and conduits having relatively large cross-sectional dimensions, such as for example electric generator lines or waste water pipes and air conditioning systems, can be attached by means of the fastener arrangement according to the invention.

According to a further variant configuration, at least one functional support for fixing at least one conduit is attachable to the fastener by locking-on.

This allows a fastener embodied as a basic body to be embodied for attaching a large number of different types of conduits by merely exchanging the functional support and the number of fasteners to be made available for a large number of conduit variants, such as for example electrical supply or control lines, fibre-optic cables, hydraulic lines or air conditioning systems, to be reduced.

Further advantageous configurations of the fuselage cell structure are presented in the further patent claims.

DESCRIPTION OF EXEMPLARY EMBODIMENTS

Figure 1:
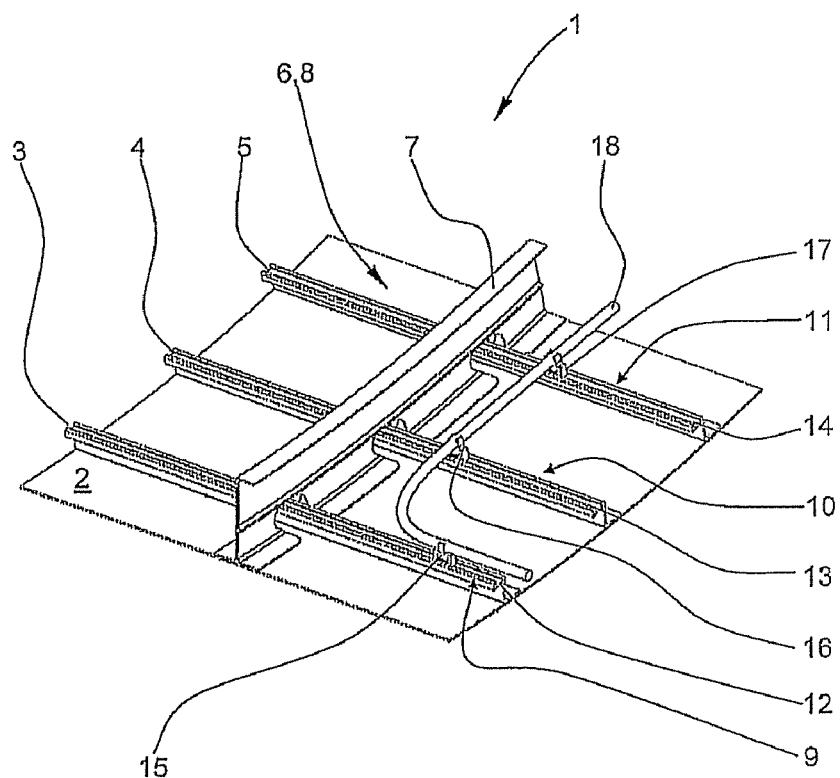
FIG. 1 is a perspective view of a detail of a fuselage cell structure of an aircraft with a fixed conduit.

In the drawings, like constructional elements each display the same reference numeral.

FIG. 1 shows a perspective detail of a fuselage cell structure of an aircraft.

A fuselage cell structure 1 of an aircraft (not shown) comprises inter alia a fuselage cell skin 2 with stringers 3 to 5 arranged thereon as (longitudinal) reinforcing elements 6. The stringers 3 to 5 each have a roughly Z-shaped cross-sectional geometry. An annular former 7, as a further (transverse) reinforcing element 8 of the fuselage cell structure 1, runs transversely to the stringers 3 to 5. The annular former 7 has a substantially T-shaped cross-sectional geometry with a flange which is angled in the head region at an angle of 90°. The grooves 12 to 14, in which fasteners 15 to 17 for fixing a conduit 18 are secured, run in head regions 9 to 11 of the stringers 3 to 5 in each case in the longitudinal direction of the stringers 3 to 5. In principle, the grooves 12 to 14 can also be arranged outside the head regions 9 to 11, provided that the connection of the stringers 3 to 5 to the fuselage cell skin 2 and also further components is not impaired as a result. Alternatively, the stringers 3 to 5 can also have an omega-shaped cross-sectional geometry.

Figure 2:
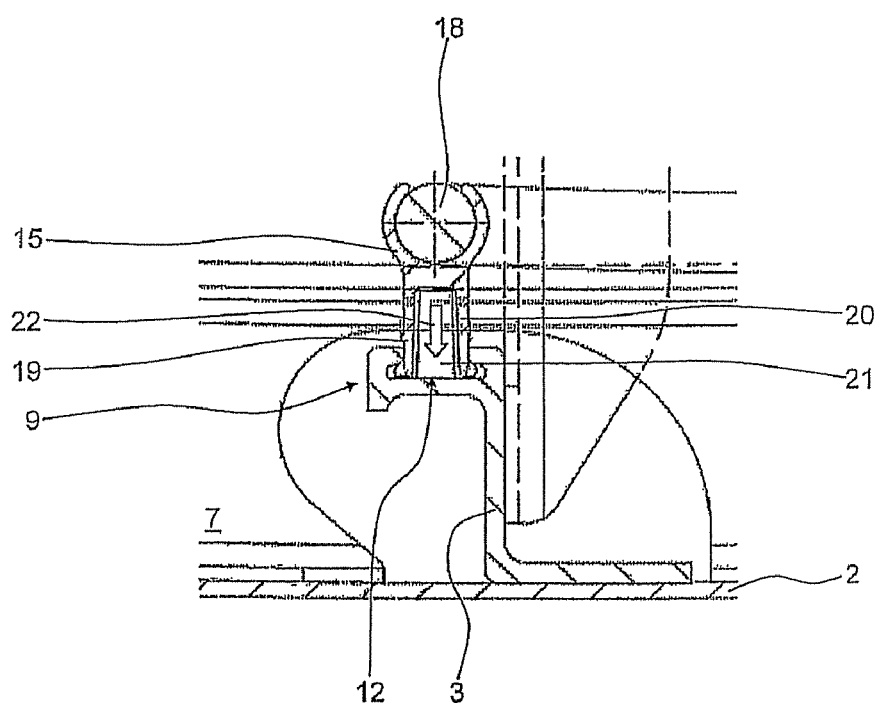
FIG. 2 is an enlarged cross-sectional view through the middle stringer of FIG. 1 with a detail of the annular former that is positioned thereafter.

FIG. 2 is an enlarged cross-sectional view of the left stringer in FIG. 1 with an annular former running thereafter.

The fastener 15 is fixed in the groove 12 running in the head region 9 of the stringer 3. The groove 12 has—like the other grooves—an inverted T-shaped cross-sectional geometry. The fastener 15 is equipped with two retaining feet 19,20 which are arranged at the lower face thereof and can be spread outward by means of a fixing element 21 to produce a pressing and friction fit with the groove 12 and in this way to secure the fastener 15 at the intended position on the stringer 3. The fixing element 21 (press-in mandrel), which is for example cylindrically configured, is pressed-in in the direction of the arrow 22. In order to prevent accidental detachment of the fastener 15, the fixing element 21 interlocks in the illustrated position with the fastener 15. Instead of the fixing element 21, a screwing element can for example also be provided for fixing the fastener 15 in the groove 12. In an upper region, the fastener 15 has a fork which is embodied in an omega-shaped manner for accommodating the conduit 18, preferably in a locking fashion. Alternatively, the conduit 18 can also be fixed to the fastener 15 by means of additional cable ties or comparable means. The fastener 15 can be formed in one piece with a fibre-reinforced, preferably thermoplastic polymer.

A two-part embodiment of the fastener for the conduits is provided in a variant embodiment (not shown in the drawings). In this constellation, the fastener comprises a basic body with retaining feet which are, again, embodied at the lower face thereof—as shown in FIG. 2—and can be introduced into the groove 12 of the stringer 3 and can be clamped therein, creating a positive fit at least in certain regions. What is known as a functional support, which is individually adapted to the type of conduit to be fixed in each case and/or the number of conduits to be attached, can preferably be locked onto the basic body of the fastener. As a result of this configuration, it is possible to fix a larger number of different types of conduit using one and the same basic body of the fastener and at the same time to limit the number of types of fastener to be made available.

Figure 3:
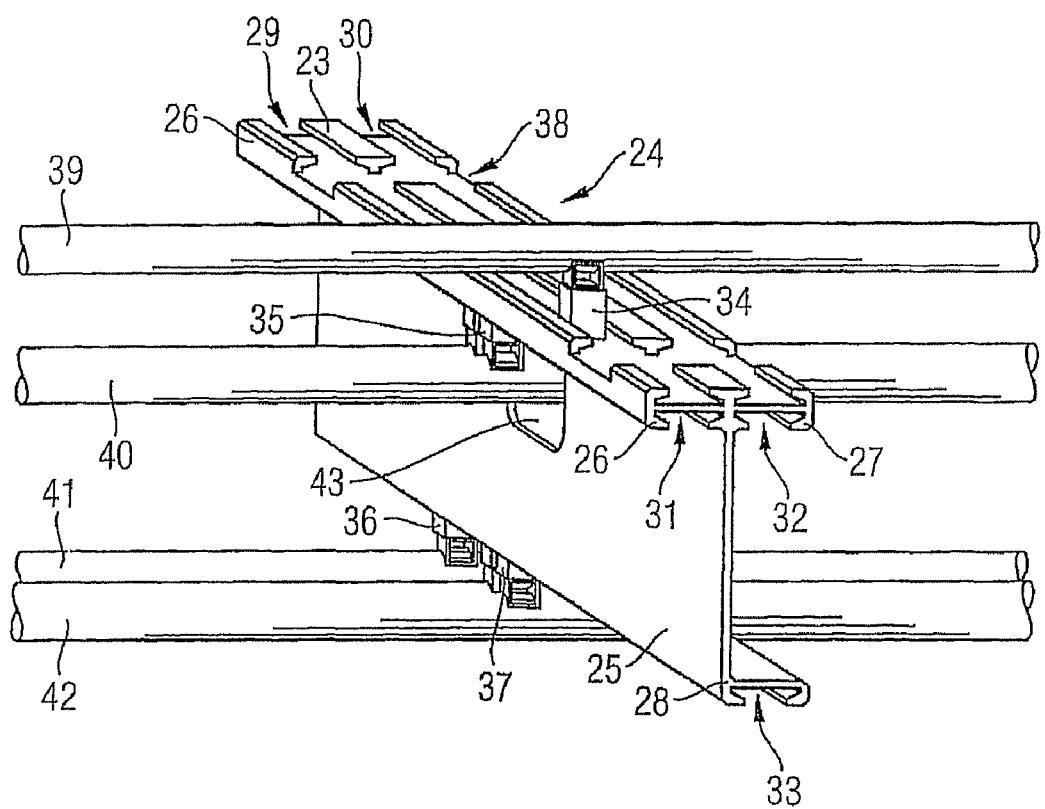
FIG. 3 is a perspective view of a crossbar with a large number of grooves for attaching the fasteners.

FIG. 3 is a perspective view of a sectional illustration through a crossbar for a floor frame in a passenger aircraft with a large number of grooves for attaching a plurality of fasteners.

A crossbar 23 as a reinforcing element 24, in particular for supporting a floor frame within a fuselage cell structure of a passenger aircraft, has a substantially T-shaped cross-sectional geometry. A left and a right head flange 26,27, each configured symmetrically to each other, adjoin an upper end of a perpendicularly running web 25, while at a lower end of the web 25 a foot flange 28 adjoins said web, at an angle of 90° on the right side of the web. All of the flanges 26 to 28 are each preferably the same width. According to the invention, grooves 29 to 32 are formed in a respective upper face and lower face of the two head flanges 26,27. A further groove 33 is formed in the foot flange 28 at the lower face thereof. The grooves 29 to 33 have, again, an inverted T-shaped cross-sectional geometry (cf. stringer in FIGS. 1,2) in order to be able to attach the four fasteners 34 to 37 therein. The final number and arrangement of the grooves 29 to 33 in the region of the crossbar 23 varies as a function of the individual application.

Although the detailed design of the attachment of the fasteners 34 to 37 in the grooves 29 to 33 is not shown in greater detail for the sake of clarity, it corresponds in its construction to the attachment, illustrated and described in FIGS. 1, 2, of the fasteners 15 to 17 in the stringers 3 to 5 by means of a combined pressing and friction fit which is caused by the spreading of at least two retaining feet embodied on the fastener at the lower face thereof within the groove as a result of the driving-in of a spreading mandrel as a fixing element.

In contrast to the configuration based on the grooves in FIGS. 1,2, the upper grooves 29 and 30 are provided with recesses, of which merely a recess 38 is denoted by a reference numeral, in order not to impair the connection of further functional elements or structural elements, such as for example seat rail profiled parts (not shown in FIG. 3, but cf. FIG. 4) or the like. Conduits or bunched conduits 39 to 42 are guided and attached in each of the fasteners 34 to 37, the conduits 39 to 42 each running at an angle of about 90° in relation to a longitudinal axis of the crossbar 23. With regard to the carrying-out of the attachment of the conduits 39 to 42 in the fasteners 34 to 37, reference may be made to the foregoing [discussion] in the description of the attachment of the conduit 18 in the fasteners 15 to 17 in FIGS. 1,2.

In order to allow the conduit 40 to pass at the lower face thereof through the web 25 of the crossbar 23, said web has a feed-through aperture 43 which is produced in the crossbar following the extrusion process by removing material, for example. The recesses in the grooves 29 to 33 can be produced by milling, for example, if an integral production is not possible as early as during the process of extruding the crossbar 23.

The fasteners 34 to 37 can be embodied in one piece or in two parts. In the case of fasteners 34 to 37 configured in two parts, said fasteners each consist of a basic body which can be attached in the grooves 29 to 33 by clamping by means of a pressing fit, creating a positive fit at least in certain regions in the described manner. A functional support, which is individually adapted to the type of conduit to be attached and is used to fix the conduit in position, is then locked onto each of the basic bodies.

Figure 4:
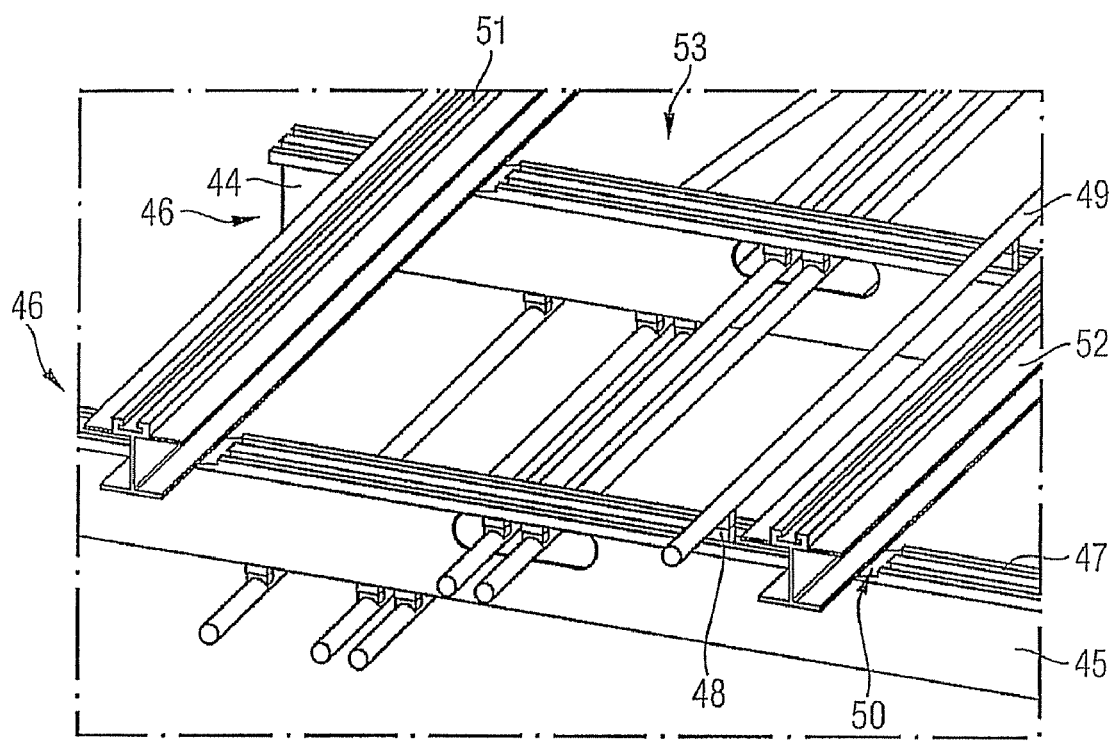
FIG. 4 is a plan view onto two crossbars as shown in FIG. 3 with seat rail profiled parts resting thereon.

FIG. 4 is a further plan view onto two crossbars which are configured as in FIG. 3 and each have seat rail profiled parts resting thereon.

Two crossbars 44,45, each embodied as shown in FIG. 3, as the reinforcing element 46, have a large number of grooves with fasteners attached therein, of which merely a groove 47 and a fastener 48 with a conduit 49 accommodated therein are denoted by a reference numeral. In the region of four recesses in total, of which a recess 50, which is representative of the other recesses, is provided with a reference numeral, the grooves formed in the head region of the crossbar 44,45 are interrupted. In the recesses, two seat rail profiled parts 51,52 running transversely to the crossbars 44,45 rest on the crossbars 44,45 and form a part of a floor frame 53 (not shown in its entirety) for supporting floor panels (likewise not shown) in a passenger compartment of an aircraft.

The fuselage cell structure 1 configured in accordance with the invention for the facilitated attachment of fasteners for all types of conduits, in particular in the region of stringers and crossbars of floor frames, allows the fasteners required for large parts of the cabling to be attached largely without the need to form holes. In addition, the resulting conduit guides can be rapidly adapted to varying installation requirements by simple detachment and displacement of individual fasteners or whole groups of fasteners in the grooves.

LIST OF REFERENCE NUMERALS

| | |
|---|---|
| 1 fuselage cell structure | |
| 2 fuselage cell skin | |
| 3 stringer | |
| 4 stringer | |
| 5 stringer | |
| 6 reinforcing element | |
| 7 annular former | |
| 8 reinforcing element | |
| 9 head region | |
| 10 head region | } stringer |
| 11 head region | |
| 12 groove | |
| 13 groove | |
| 14 groove | |
| 15 fastener | |
| 16 fastener | |
| 17 fastener | |
| 18 conduit | |
| 19 retaining foot | |
| 20 retaining foot | |
| 21 fixing element | |
| 22 arrow | |
| 23 crossbar | |
| 24 reinforcing element | |
| 25 web | |
| 26 left head flange | |
| 27 right head flange | |
| 28 foot flange | |
| 29 groove | } head flange |
| 30 groove | |
| 31 groove | } head flange |
| 32 groove | |
| 33 groove (foot flange) | |
| 34 fastener (left head flange upper face) | |
| 35 fastener (left head flange lower face) | |
| 36 fastener (foot flange) | |
| 37 fastener (foot flange) | |
| 38 recess (head flange) | |
| 39 conduit | |
| 40 conduit | |
| 41 conduit | |
| 42 conduit | |
| 43 feed-through aperture (web) | |
| 44 crossbar | |
| 45 crossbar | |
| 46 reinforcing element | |
| 47 groove | |
| 48 fastener | |
| 49 conduit | |
| 50 recess | |
| 51 seat rail profiled part | |
| 52 seat rail profiled part | |
| 53 floor frame | |

The invention claimed is:

1. A fuselage cell structure of an aircraft for simplified installation and attachment of at least one fastener for at least one conduit, the fuselage cell structure having a large number of reinforcing elements and the reinforcing elements having at least in certain regions at least one groove, characterised in that the reinforcing elements are formed using an aluminum alloy material, the reinforcing elements are embodied as stringers having a substantially Z-shaped cross-sectional geometry, the at least one groove running in a head region of the stringer, or as crossbars arranged in the region of a floor frame, the at least one groove running in head flanges and/or foot flanges of the crossbars, wherein at least one fastener for positionally fixing at least one conduit can be is attached in the at least one groove, and wherein the at least one fastener has at least two retaining feet which can be locked into the at least one groove, the at least two retaining feet each having a vertical portion extending from a common linkage element and each having a horizontal portion adapted to be locked into the at least one groove, wherein the retaining feet can be spread apart by at least one fixing element to produce a pressing and friction fit with the at least one groove.

2. The fuselage cell structure according to claim 1, wherein the at least one groove has a substantially inverted T-shaped cross-sectional geometry.

3. The fuselage cell structure according to claim 1, wherein the at least one fixing element is protected from accidental detachment by interlocking with the at least one fastener.

4. The fuselage cell structure according to claim 1, wherein the at least one conduit can be attached directly to the at least one fastener.

5. The fuselage cell structure according to claim 1, further comprising at least one support member for accommodating the at least one conduit, the at least one support member being securely attached to, in particular locked onto, the at least one fastener.

6. The fuselage cell structure according to claim 1, wherein the at least one groove is interrupted by at least one recess for arranging further functional elements, in particular seat rail profiled parts, therein extending transverse to the reinforcing elements.

* * * * *